United States Patent
Irie et al.

(10) Patent No.: US 7,509,097 B2
(45) Date of Patent: Mar. 24, 2009

(54) METHOD FOR DETERMINING A MEASUREMENT TIME PERIOD

(75) Inventors: Masataka Irie, Osaka (JP); Akifumi Nagao, Osaka (JP); Takeshi Yoshida, Osaka (JP); Taro Mikami, Osaka (JP)

(73) Assignee: Panasonic Corporation, Osaka (JP)

( * ) Notice: Subject to any disclaimer, the term of this patent is extended or adjusted under 35 U.S.C. 154(b) by 652 days.

(21) Appl. No.: 11/355,940

(22) Filed: Feb. 17, 2006

(65) Prior Publication Data
US 2006/0183441 A1 Aug. 17, 2006

(30) Foreign Application Priority Data
Feb. 17, 2005 (JP) ............... 2005-041005

(51) Int. Cl.
*H04B 17/00* (2006.01)
(52) U.S. Cl. ............. 455/67.13; 455/67.11; 455/67.16; 455/68; 455/41.2; 455/561; 455/423; 455/424; 455/425; 455/500; 455/502; 455/507; 370/503; 370/509; 370/449; 370/450; 370/346
(58) Field of Classification Search ......... 455/418–420, 455/41.2, 500–502, 507–515, 67.11–67.16, 455/68–69, 561, 423–425, 522; 370/338, 370/346, 350, 445–450, 458–462, 503, 509–514, 370/318
See application file for complete search history.

(56) References Cited

U.S. PATENT DOCUMENTS

| | | | |
|---|---|---|---|
| 5,111,535 A | 5/1992 | Tokunaga | |
| 7,024,188 B2* | 4/2006 | Khun-Jush et al. | 455/423 |
| 7,231,215 B2* | 6/2007 | Lewis et al. | 455/450 |
| 7,257,099 B2* | 8/2007 | Myojo | 370/329 |
| 7,373,245 B2* | 5/2008 | Jenkins et al. | 701/207 |
| 2002/0061031 A1* | 5/2002 | Sugar et al. | 370/466 |
| 2003/0017830 A1 | 1/2003 | Kayama et al. | |
| 2003/0185244 A1* | 10/2003 | Wu et al. | 370/503 |

FOREIGN PATENT DOCUMENTS

| | | | |
|---|---|---|---|
| JP | 11-18143 A | 1/1999 | |
| JP | 11-18144 A | 1/1999 | |

\* cited by examiner

*Primary Examiner*—Tuan A Tran
(74) *Attorney, Agent, or Firm*—McDermott Will & Emery LLP

(57) ABSTRACT

A method for determining a measurement time period for measuring a propagation environment in a wireless station set having a plurality of wireless stations, between which wireless communication is made using a channel selected from a plurality of channels different in frequency. The method includes the steps of: obtaining a measurement time period in another wireless station set having a plurality of wireless stations; and determining the measurement time period in the own wireless station set so as to have a time period that does not overlap the obtained measurement time period.

19 Claims, 14 Drawing Sheets

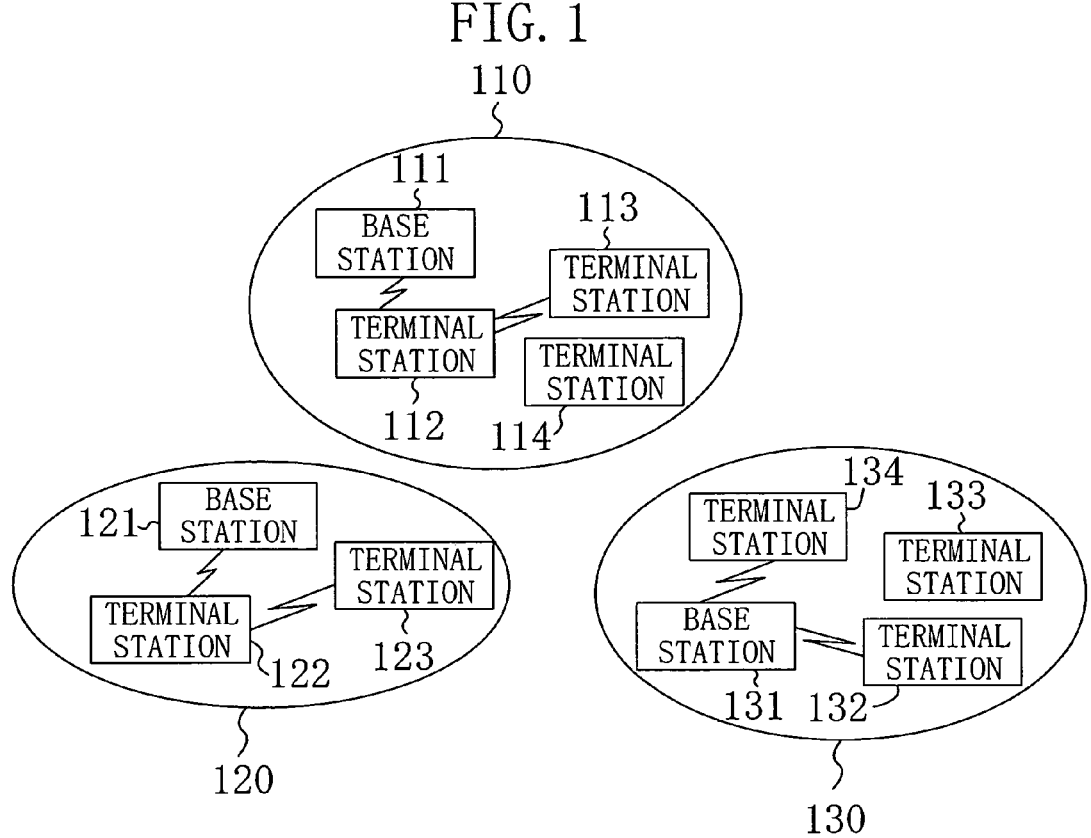
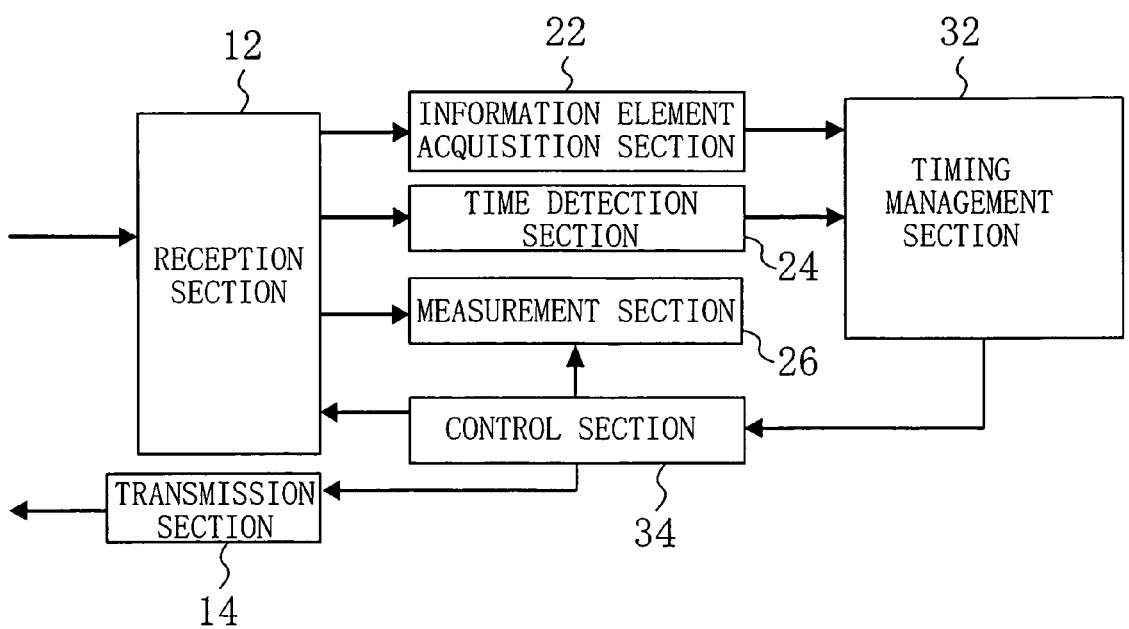

FIG. 3

| SIGNAL TYPE ID CODE |
| --- |
| RECEIVER STATION ID CODE |
| WIRELESS STATION SET ID CODE |
| TRANSMITTER STATION ID CODE |
| BEACON TRANSMISSION TIME BT |
| BEACON TRANSMISSION INTERVAL BI |
| MEASUREMENT MODE MD |
| MEASUREMENT FREQUENCY MF |
| MEASUREMENT START TIME MS |
| MEASUREMENT TIME PERIOD LENGTH ML |
| MEASUREMENT END TIME ME |
| NUMBER OF TIMES OF MEASUREMENT MN |

WIRELESS STATION SET 120

WIRELESS STATION SET 130

METHOD FOR DETERMINING A MEASUREMENT TIME PERIOD

BACKGROUND OF THE INVENTION

The present invention relates to a wireless communication technology using a channel selected from a plurality of channels different in frequency.

A mobile wireless communication system is known in which communication is made within a wireless station set including a base station and terminal stations. The base station transmits beacons for transporting various types of information to the terminal stations. To avoid interference with beacons used in other wireless station sets, synchronization must be secured between base stations to ensure non-overlapping in the timing of beacons.

FIG. 21 is a view demonstrating a method for securing synchronization among base stations. This method is disclosed in Japanese Laid-Open Patent Publication No. 11-18143, for example. Referring to FIG. 21, a base station CS-N is transmitting beacons BBN at predetermined timing. A base station CS-M, once being started, receives a beacon from a neighboring base station. When receiving the beacon BBN from the base station CS-N, the base station CS-M computes the difference m-n between a unique number n of the base station CS-N transmitting the beacon BBN and its own unique number m, and outputs its own beacon BBM at a time shifted from the transmittance time of the base station CS-N by a time corresponding to m-n. Thereafter, when a base station CS-M' is started, it receives the beacon BBN from the base station CS-N or the beacon BBM from the base station CS-M, and determines the transmittance time of its own beacon in the manner described above with reference to the base station CS-M.

As described above, the base stations in FIG. 21 output their beacons at such timing that no interference or disturbance wave against neighboring base stations will arise, to thereby establish synchronization of the entire system. A related technology is also disclosed in Japanese Laid-Open Patent Publication No. 11-18144.

The above synchronization method is provided for allowing wireless station sets each including a base station and terminal stations to output their beacons without causing interference or issuing disturbance waves against each other, to thereby secure communication routes in the respective wireless station sets.

There is also known a mobile wireless communication system in which communication is made by selecting a channel of a frequency more suitable for communication according to the propagation environment varying with time. In such a system, the propagation environment must be measured in search for a frequency more suitable for communication. During the time period of the measurement of the propagation environment, wireless stations stop issuing their own radio waves.

If a plurality of wireless stations perform the measurement at the same timing, all of them will measure the propagation environment during the time period in which no transmission wave exists, although the propagation environment would have been congested with communications made by the wireless stations during any time period other than the measurement time period. In this case, the measurement result will fail to correctly reflect the degree of congestion at the frequency measured.

If measurement is performed at a fixed period, the following event may occur. That is, once the measurement timing coincides between wireless stations, this state of coincidence of the measurement time period will continue unless any of the wireless stations is stopped in operation and then restarted.

SUMMARY OF THE INVENTION

An object of the present invention is providing more correct measurement of the propagation environment to enable selection of a channel of a frequency suitable for communication.

Specifically, the method of the present invention is a method for determining a measurement time period for measuring a propagation environment in a wireless station set having a plurality of wireless stations, wireless communication being made between the plurality of wireless stations using a channel selected from a plurality of channels different in frequency, the method including the steps of: obtaining a measurement time period in another wireless station set having a plurality of wireless stations; and determining the measurement time period in the own wireless station set so as to have a time period that does not overlap the obtained measurement time period.

According to the invention described above, it is possible to secure a time period other than a measurement time period in another wireless station set, that is, other than a time period during which another wireless station set stops data transmission to perform measurement, as the measurement time period in the own wireless station set, and thus measure the propagation environment correctly. This makes it possible to select a channel of an appropriate frequency and conduct communication using the selected channel.

Preferably, the method described above further includes the steps of: receiving a beacon transmitted by a wireless station belonging to the another wireless station set; and acquiring information transmitted with the beacon, wherein the step of obtaining a measurement time period in another wireless station set includes obtaining a measurement time period in the another wireless station set based on the information.

Preferably, the step of determining the measurement time period includes determining the measurement time period so that a start time of the measurement time period in the own wireless station set does not coincide with a start time of the measurement time period in the wireless station set including the wireless station that has transmitted the beacon.

Preferably, the step of determining the measurement time period includes determining the measurement time period so that the length of the measurement time period in the own wireless station set does not coincide with the length of the measurement time period in the wireless station set including the wireless station that has transmitted the beacon.

Preferably, the step of determining the measurement time period includes determining the measurement time period so that the number of times of measurement performed within a predetermined time period in the own wireless station set does not coincide with the number of times of measurement performed within the predetermined time period in the wireless station set including the wireless station that has transmitted the beacon.

Preferably, the step of determining the measurement time period includes determining the measurement time period in the own wireless station set so that if the wireless station set including the wireless station that has transmitted the beacon is in a measurement ON mode, the measurement is performed after the measurement ON mode in this wireless station set is cleared.

Preferably, the method described above further includes the steps of: receiving a radio wave transmitted by a wireless station belonging to the another wireless station set; and obtaining the time period during which the radio wave has not been received, wherein the step of obtaining a measurement time period in another wireless station set includes estimating the time period during which the radio wave has not been received as the measurement time period in the another wireless station.

Preferably, the step of determining the measurement time period includes determining the measurement time period so that a start time of the measurement time period in the own wireless station set does not coincide with a start time of the measurement time period in the wireless station set including the wireless station that has transmitted the radio wave.

Preferably, the step of determining the measurement time period includes determining the measurement time period so that the length of the measurement time period in the own wireless station set does not coincide with the length of the measurement time period in the wireless station set including the wireless station that has transmitted the radio wave.

Preferably, the step of determining the measurement time period includes determining the measurement time period so that the number of times of measurement performed within a predetermined time period in the own wireless station set does not coincide with the number of times of measurement performed within the predetermined time period in the wireless station set including the wireless station that has transmitted the radio wave.

Preferably, the method described above further includes the step of: acquiring from the radio wave an ID code indicating the wireless station set that has transmitted the radio wave, wherein the step of obtaining a measurement time period in another wireless station set includes estimating the time period during which the radio wave has not been received from the wireless station set indicated by the ID code, as the measurement time period in this wireless station.

Preferably, the method described above further includes the step of: determining the measurement time period in the own wireless station set and changing a transmission time of its own beacon based on the determined measurement time period.

Preferably, the method described above further includes the step of: determining the measurement time period in the own wireless station set and changing a transmission interval of its own beacon based on the determined measurement time period.

Preferably, the step of determining the measurement time period includes successively changing the interval between a measurement time period and the next measurement time period in the own wireless station set.

Preferably, the step of determining the measurement time period includes successively changing the interval between a transmission time of a beacon and a start time of the measurement time period in the own wireless station set.

Preferably, the step of determining the measurement time period includes successively changing the length of the measurement time period in the own wireless station set.

Preferably, the step of determining the measurement time period includes successively changing the number of times of measurement within a predetermined time period.

Preferably, the predetermined time period is a time period between a beacon and the next beacon in the own wireless station set.

Preferably, the method described above further includes the step of: performing measurement during the determined measurement time period, wherein the step of determining the measurement time period includes determining the subsequent measurement time period based on the result of the measurement.

According to the present invention, since each wireless station can measure the propagation environment avoiding a time period during which another wireless station set stops data transmission, the degree of congestion of a frequency of which use is intended can be correctly determined. Since a frequency more suitable for communication can be determined correctly, it is possible to change the currently used frequency to a more appropriate frequency if communication becomes difficult due to interference and the like in the currently used frequency. As a result, communication with high reliability and high quality can be attained.

BRIEF DESCRIPTION OF THE DRAWINGS

FIG. 1 is a block diagram of a mobile communication system in Embodiment 1 of the present invention.

FIG. 2 is a block diagram of a base station 111 in FIG. 1.

FIG. 3 is a view showing examples of information transmitted with a beacon.

DESCRIPTION OF THE PREFERRED EMBODIMENTS

Figure 4:
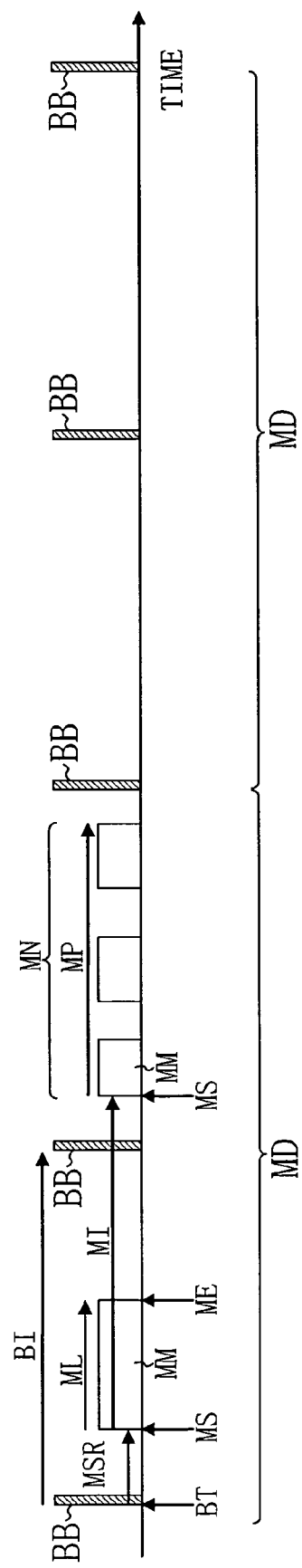
FIG. 4 is a timing chart showing an example of timing of beacons and the time periods during which measurement is performed.

Hereinafter, preferred embodiments of the present invention will be described with reference to the accompanying drawings.

Embodiment 1

FIG. 1 is a block diagram of a mobile communication system in Embodiment 1, which includes wireless station sets 110, 120 and 130. The wireless station set 110 includes a base station 111 and terminal stations 112, 113 and 114. The wireless station set 120 includes a base station 121 and terminal stations 122 and 123. The wireless station set 130 includes a base station 131 and terminal stations 132, 133 and 134. These base stations and terminal stations are wireless stations allowed to conduct communication using a channel selected from a plurality of channels different in frequency. The base stations 111, 121 and 131 respectively select a channel from the plurality of channels different in frequency, and in the respective wireless station sets 110, 120 and 130, wireless communication is made among the wireless stations belonging thereto using the selected channel. The wireless station sets 110, 120 and 130 are also called basic service sets (BSSs).

The base station 111 and the terminal stations 112 to 114 measure, as required, the propagation environment at a frequency of which use is intended. The base station 111 determines the measurement timing, the length of the measurement time period, the number of times of measurement and the frequency at which the measurement is made, while the terminal stations 112 to 114 perform the measurement according to the decision by the base station 111. These stations stop their transmission operation during the measurement time period. Examples of the measurement include detection of interference, measurement of the field intensity, detection of adjacent channel leakage, detection of synchronization and check of an error-detecting code. From the measurement results, the degree of congestion at the frequency in question is known.

The base station 111 transmits beacons at fixed intervals. The beacon is a signal provided for notifying the terminal stations 112 to 114 in the same wireless station set 110 to which the base station 111 belongs of various types of information. The base stations 121 and 131 also transmit their beacons. The base stations 111, 121 and 131 determine the transmission timing of their beacons.

The base station 111 determines the measurement time period for the wireless station set 110 and notifies the terminal stations 112 to 114 of the determined measurement time period with a beacon. The measurement of the propagation environment is performed, not only for the currently used frequency, but also for other usable frequencies.

Based on the measurement results, the wireless station set 110 changes the currently used frequency to a more suitable frequency. In the change of the frequency, the base station 111 determines a new frequency and instructs the terminal stations 112 to 114 belonging to the same wireless station set to change the frequency.

The wireless station sets 120 and 130 also operate roughly in the same manner as the wireless station set 110, to determine the frequency to be used for each wireless station set. Hereinafter, description will be mainly made for the wireless station set 110. Note however that the description is also roughly applicable to the wireless station sets 120 and 130.

The role of the base station in a wireless station set may be shared by a terminal station in the same wireless station with the lapse of time. In other words, the base station 111 may operate as a terminal station, and any one of the terminal stations 112 to 114 may operate as the base station.

There may also exist a wireless station set other than the wireless station sets 110, 120 and 130.

FIG. 2 is a block diagram of the base station 111 in FIG. 1. The base station 111 includes a reception section 12, a transmission section 14, an information element acquisition section 22, a time detection section 24, a measurement section 26, a timing management section 32 and a control section 34. The configuration of the terminal stations 112 to 114 is substantially the same as that of the base station 111 described above although not specifically described.

The reception section 12 receives a radio wave via an antenna, demodulates the received radio wave and outputs the demodulated result to the information element acquisition section 22 and the measurement section 26. The reception section 12 also notifies the time detection section 24 of reception of the radio wave. The information element acquisition section 22 acquires information transmitted from another base station with a beacon via the reception section 12, and outputs the received information to the timing management section 32.

The time detection section 24 detects the time at which the reception section 12 receives a radio wave, and outputs the detection result to the timing management section 32 as time information. The measurement section 26 performs measurement of the radio wave received by the reception section 12 during a designated measurement time period.

The timing management section 32 manages the times of transmission, reception, measurement and the like using the information received from the information element acquisition section 22 and the time information received from the time detection section 24, considering the difference between times in the own wireless station set and times in another wireless station set, and sends instructions to the control section 34. The timing management section 32 correctly grasps the transmission times of beacons and the measurement time periods in the neighboring wireless station set 120 and the like, based on the information transported with the beacons and the time information.

The control section 34 issues instructions such as "operate" and "stop" to the reception section 12 and the transmission section 14, and also notifies the measurement section 26 of the measurement time periods, based on the instructions received from the timing management section 32. The transmission section 14 performs modulation with data to be transmitted and transmits a radio wave. In the case of serving as a base station, the transmission section 14 also transmits a beacon.

FIG. 3 shows examples of information transmitted with a beacon. As shown in FIG. 3, a beacon carries a signal type ID code, a receiver station ID code, a wireless station set ID code, a transmitter station ID code, a beacon transmission time BT, a beacon transmission interval BI, a measurement mode MD, a measurement frequency MF, a measurement start time MS, a measurement time period length ML, a measurement end time ME and the number of times of measurement MN. FIG. 4 is a timing chart showing an example of the timing of beacons and the time periods during which measurement is performed. Information transmitted with beacons BB will be described with reference to FIGS. 3 and 4.

The signal type ID code is a code given to allow a receiver station to identify the type of the transmitted signal. In this example, the code indicates that the signal is a beacon. The receiver station ID code is a code for identifying the station that should receive the signal. In the case of the beacons BB, all the terminal stations are designated. The wireless station set ID code is a code for identifying the wireless station set to which the wireless station that has transmitted the signal belongs. The transmitter station ID code is a code for identifying the wireless station that has transmitted the signal.

The beacon transmission time BT indicates the time at which a beacon BB is transmitted. The beacon transmission interval BI indicates the interval at which the base station transmits the beacons BB. The measurement mode MD indicates whether or not the wireless station set is in the mode of performing measurement. In the example of FIG. 4, during the time period from the first beacon BB until the third beacon BB, in which measurement is performed, the measurement mode MD indicates measurement ON, while during the time period from the third beacon BB until the fifth beacon BB, in which no measurement is performed, the measurement mode MD indicates measurement OFF.

The measurement frequency MF indicates the frequency for which the wireless station set performs measurement. The measurement start time MS indicates the time at which the wireless station set starts the measurement. In place of the measurement start time MS, an interval from the beacon transmission time BT until the measurement start time (measurement start time interval MSR) may be used to give a relative measurement start time. The measurement time period length ML indicates the length of the time period during which the wireless station set performs the measurement. The measurement end time ME indicates the time at which the wireless station set terminates the measurement. The number of times of measurement MN indicates the number of times of measurement performed by the wireless station set within a predetermined time period. In the example of FIG. 4, the number of times of measurement MN is three.

In relation to the above, the following relationships are established: (Measurement start time interval MSR)=(Measurement start time MS)−(Beacon transmission time BT), and (Measurement interval MI)=(Measurement start time MS)−(Immediately preceding measurement start time MS).

The timing management section 32 of the base station 111 obtains the measurement time period MM during which measurement is performed in another wireless station set as shown in FIG. 4, from the information as shown in FIG. 3 transmitted with a beacon BB received from this wireless station set. The timing management section 32 determines the time period during which measurement is to be performed in the wireless station set 110 so as not to overlap the measurement time period MM. Hereinafter, examples of this determination will be described.

Figure 5A:
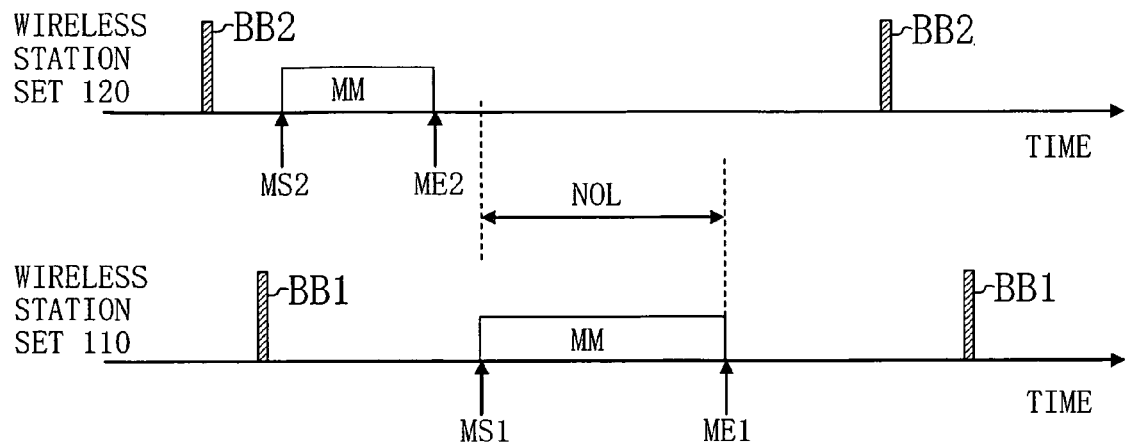
FIGS. 5A and 5B are timing charts showing examples of the case of setting the measurement start time in a wireless station set at a time different from that in another wireless station set.
Figure 5B:
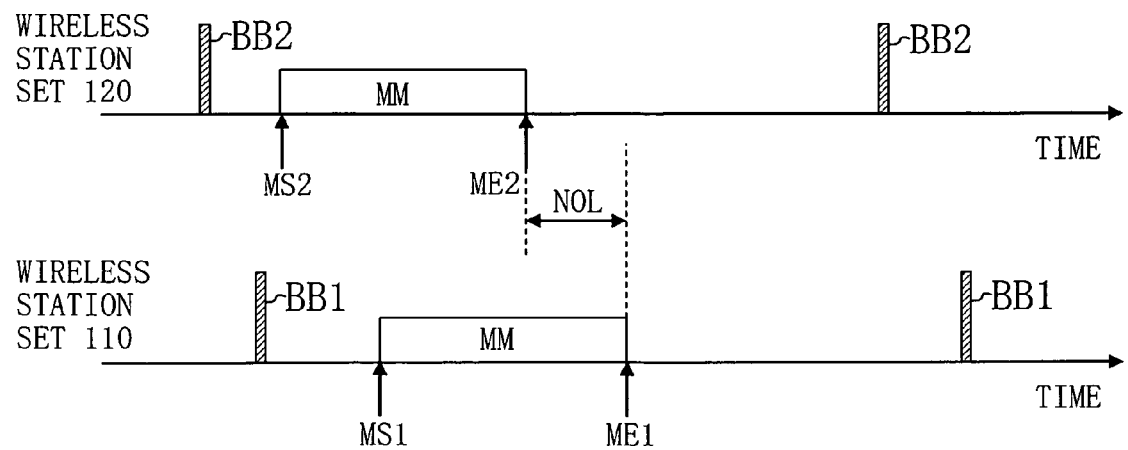

FIGS. 5A and 5B are timing charts showing examples of the case of setting the measurement start time at a time different from that in another wireless station set. Note that in these and following relevant drawings, the base station 111 in the wireless station set 110 transmits beacons BB1, while the base station 121 in the wireless station set 120 transmits beacons BB2.

Referring to FIG. 5A, the timing management section 32 determines the measurement start time MS1 in the wireless station set 110 as a time that does not coincide with the measurement start time MS2 in the wireless station set 120. In particular, the measurement start time MS1 is set to come after the measurement end time ME2 in the wireless station set 120. Therefore, the entire measurement time period MM in the wireless station set 110 can be a non-overlapping measurement time period NOL.

The timing management section 32 may determine the measurement start time MS1 as a time between the measurement start time MS2 and the measurement end time ME2 in the wireless station set 120, as shown in FIG. 5B. In this case, part of the measurement time period MM in the wireless station set 110 is the non-overlapping measurement time period NOL.

Otherwise, the timing management section 32 may determine the measurement end time ME1 in the wireless station set 110 as a time that does not coincide with the measurement end time ME2 in the wireless station set 120.

Figure 6:
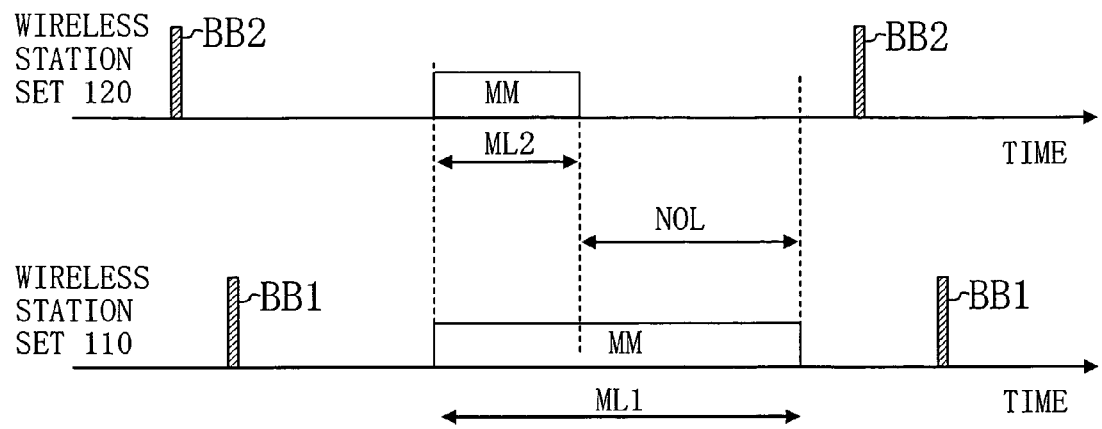
FIG. 6 is a timing chart showing an example of the case of setting the length of the measurement time period in a wireless station set at a length different from that in another wireless station set.

FIG. 6 is a timing chart showing an example of the case of setting the measurement time period at a length different from that in another wireless station set. The timing management section 32 sets the measurement time period length ML1 so as not to coincide with the measurement time period length ML2 in the wireless station set 120. In the example of FIG. 6, the timing management section 32 makes the measurement time period length ML1 longer than the measurement time period length ML2, while the measurement start time MS1 is identical to the measurement start time MS2 in the wireless station set 120. In this case, the measurement non-overlapping time period NOL can be secured after the measurement end time ME2 in the wireless station set 120.

Figure 7:
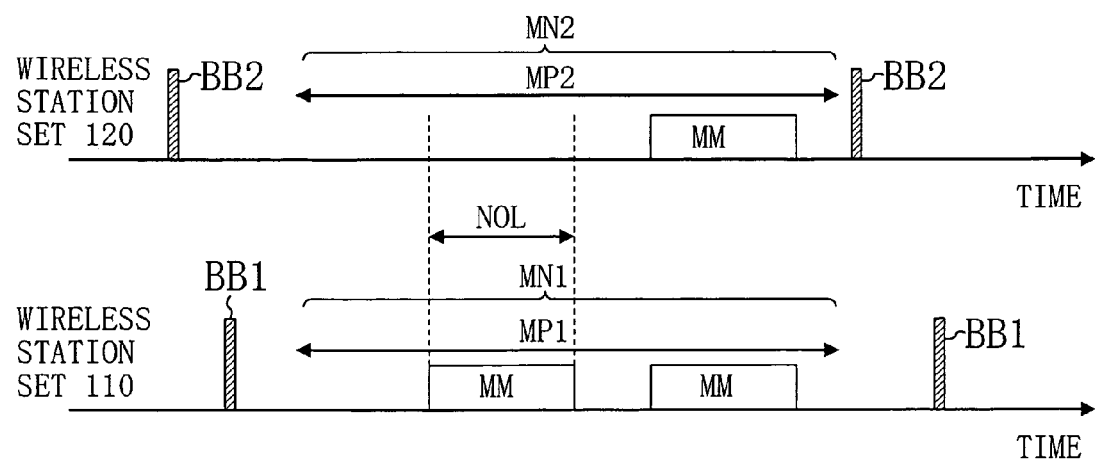
FIG. 7 is a timing chart showing an example of the case of setting the number of times of measurement in a wireless station set at a number different from that in another wireless station set.

FIG. 7 is a timing chart showing an example of the case of setting the number of times of measurement at a number different from that in another wireless station set. The timing management section 32 sets the number of times of measurement MN1 performed within a predetermined time period MP1 in the wireless station set 110 so as not to coincide with the number of times of measurement MN2 performed within a predetermined time period MP2 in the wireless station set 120. In the example of FIG. 7, the timing management section 32 determines the number of times of measurement MN1 as two that is greater than the number of times of measurement MN2 (one). In this case, as the number of times of measurement is greater in the wireless station set 110, the measurement non-overlapping time period NOL can be easily secured.

Figure 8:
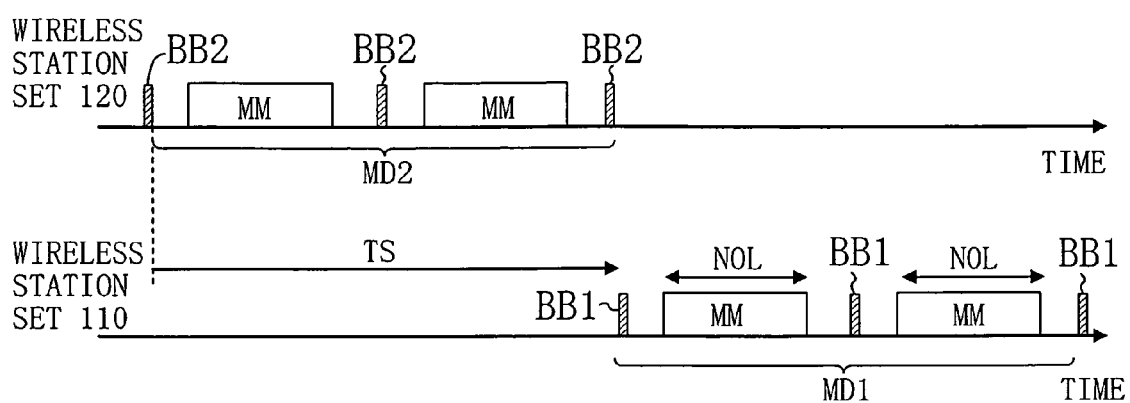
FIG. 8 is a timing chart showing an example of the case of considering the measurement mode in another wireless station set.

FIG. 8 is a timing chart showing an example of the case of considering the measurement mode in another wireless station set. As shown in FIG. 8, the timing management section 32 determines the measurement time period in the wireless station set 110 in the following manner. That is, the measurement mode MD1 in the wireless station set 110 is set OFF when the measurement mode MD2 in the wireless station set 120 is ON, and the measurement is performed only after the measurement mode MD2 becomes OFF (after the lapse of a time period TS). The timing management section 32 turns the measurement mode MD1 ON after the measurement mode MD2 becomes OFF, to perform the measurement. In this case, also, the measurement non-overlapping time period NOL can be secured.

Figure 9A:
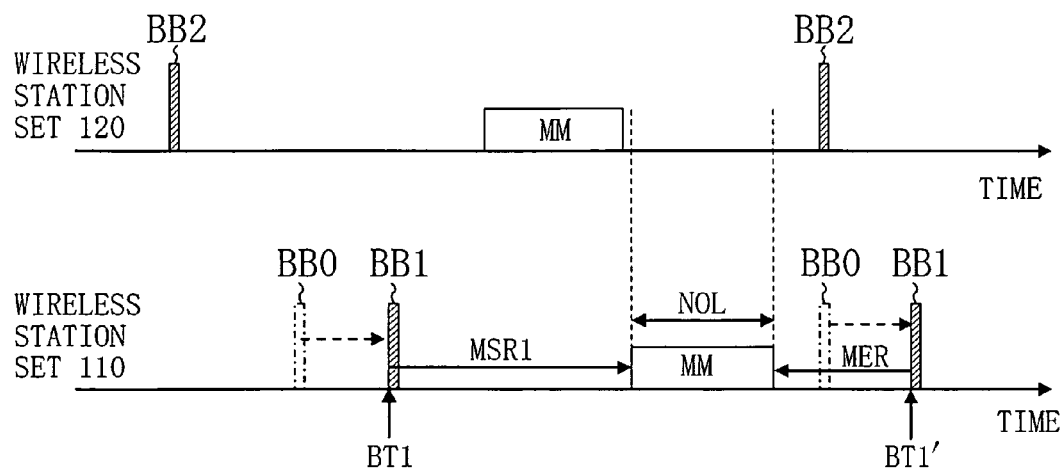
FIG. 9A is a timing chart showing an example of the case of changing the transmission time of a beacon.

FIG. 9A is a timing chart showing an example of the case of changing the transmission time of a beacon. In this case, assume that the measurement start time interval MSR1 from the beacon transmission time BT1 has been designated to give a relative measurement start time. Assume also that if a beacon BB0 is transmitted from the base station 111, the measurement time period in the wireless station set 110 will overlap the measurement time period MM in the wireless station set 120. The timing management section 32 determines the measurement time MM in the wireless station set 110 so that the overlapping time period be shortened, and then determines the transmission time BT1 of the beacon BB1 based on the determined measurement time period MM and the measurement start time interval MSR1. In other words, the transmission time of the beacon BB0 is changed based on the measurement time period MM. In this manner, also, the measurement non-overlapping time period NOL can be secured.

An interval from the measurement end time until the transmission time of a beacon issued immediately after the measurement time period MM (measurement end time interval MER1) may otherwise be designated to give a relative measurement end time. In this case, also, the transmission times BT1 and BT1' of the beacons BB1 may be determined based on the measurement time period MM, and thus the measurement non-overlapping period NOL can be secured.

Figure 9B:
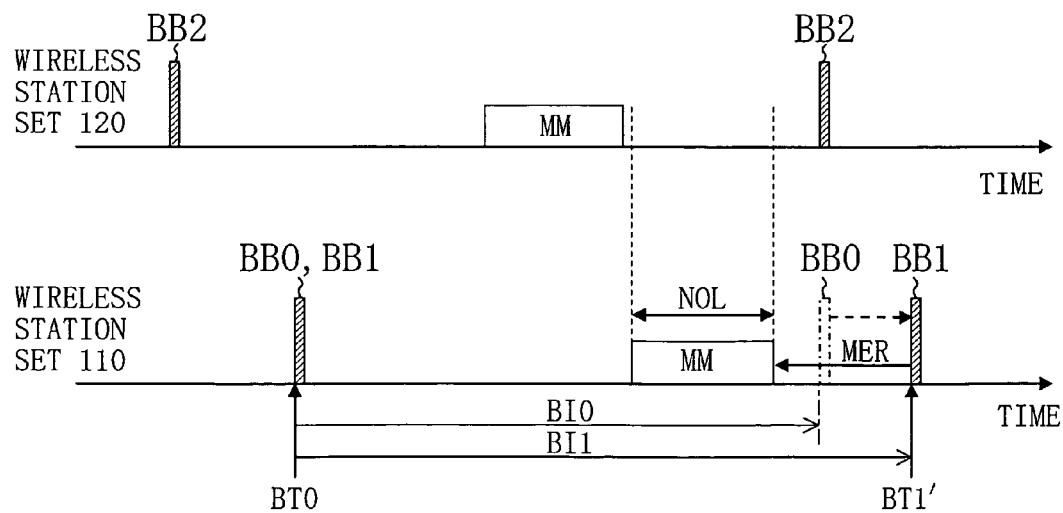
FIG. 9B is a timing chart showing an example of the case of changing the transmission interval of beacons.

FIG. 9B is a timing chart showing an example of the case of changing the transmission interval of beacons. In this case, assume that the measurement end time interval MER1 from the beacon transmission time BT1' of a beacon issued immediately after the measurement time period MM has been designated to give a relative measurement end time. The timing management section 32 determines the measurement time MM in the wireless station set 110 so that the time period overlapping the measurement time period MM in the wireless station set 120 be shortened, and then determines the transmission time BT1' of the beacon BB1 to be issued immediately after the measurement time period MM based on the determined measurement time period MM and the measurement end time interval MER1. In this case, the transmission time BT0 of the beacon BB0 issued immediately before the measurement time period MM is not changed. In other words, the timing management section 32 changes the transmission interval B10 of the beacons to the transmission interval B11. In this manner, also, the measurement non-overlapping time period NOL can be secured.

The transmission time and transmission interval of beacons may be determined as shown in FIGS. 9A and 9B before the base station 111 starts operation.

As described above, in this embodiment, in the case of a plurality of wireless station sets existing close to each other, a measurement time period free from overlapping a measurement time period in another wireless station set can be secured reliably. Therefore, measurement of the propagation environment can be performed more precisely.

Embodiment 2

Figure 10:
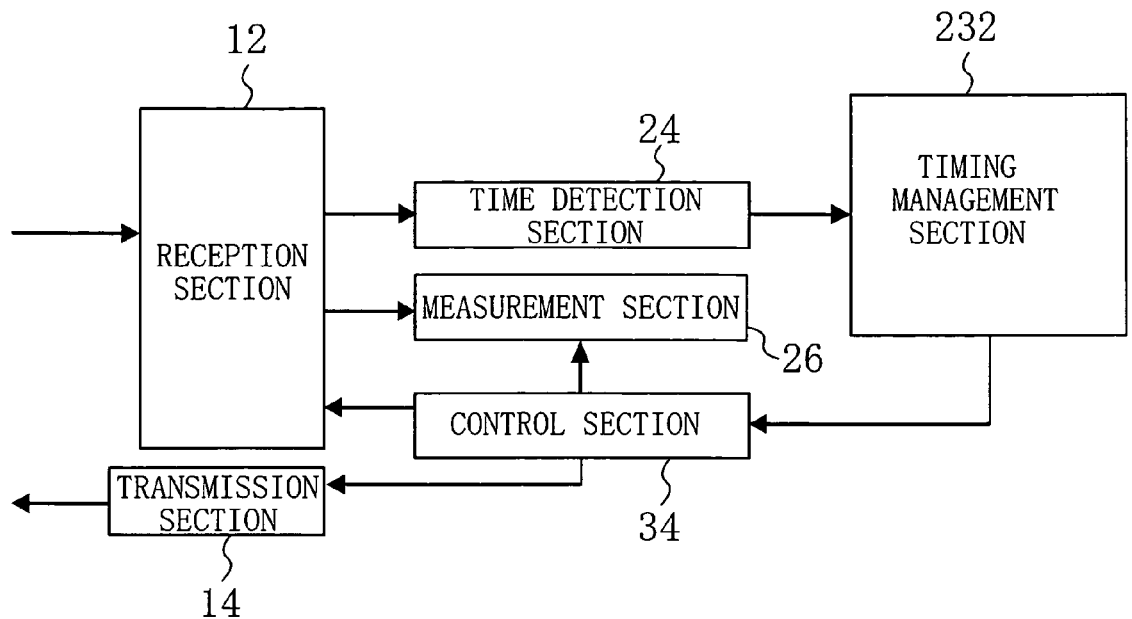
FIG. 10 is a block diagram of a base station in Embodiment 2 of the present invention.

FIG. 10 is a block diagram of a base station in Embodiment 2 of the present invention. The base station of FIG. 10 can be used in place of the base station 111 in the wireless station set 110 in FIG. 1. The base station of FIG. 10 is different from the base station 111 of FIG. 2 in that the information element acquisition section 22 is not provided and a timing management section 232 is provided in place of the timing management section 32. The other components are the same as those described above with reference to FIG. 2, and therefore description thereof is omitted here.

Figure 11:
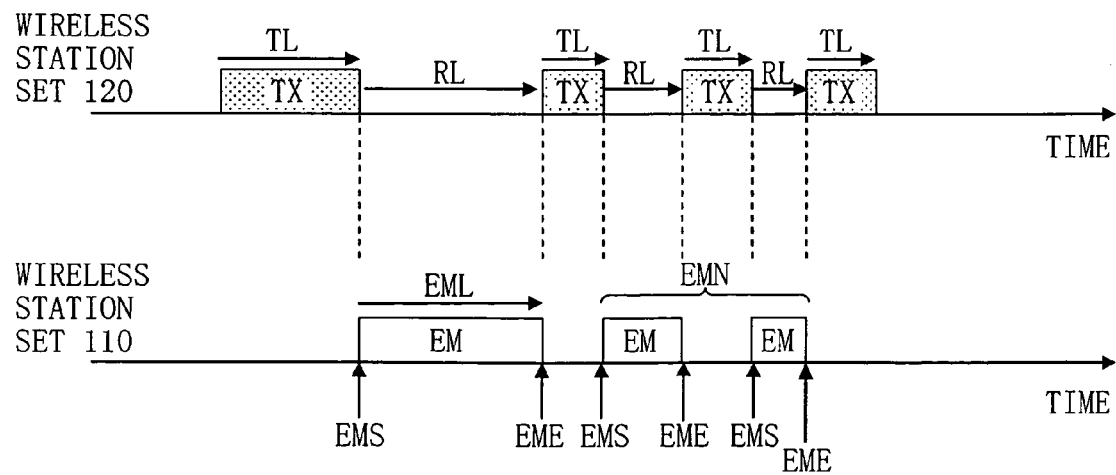
FIG. 11 is a timing chart showing the transmission time period and the rest time period in another wireless station set.

FIG. 11 is a timing chart showing transmission time periods and rest time periods in another wireless station set. The time detection section 24 outputs information indicating the time period during which a radio wave is received (transmission time period TL) and the time period during which no radio wave is received (rest time period RL) to the timing management section 232. In a wireless station set, transmission of a radio wave (TX in FIG. 11) is stopped during a measurement time period. Accordingly, the timing management section 232 estimates that rest time periods RL must be measurement time periods EM in the neighboring wireless station set 120.

The timing management section 232 may estimate that only rest time periods RL occurring periodically must be measurement time periods. Otherwise, the timing management section 232 may estimate that only rest time periods RL having a length equal to or more than a predetermined value must be measurement time periods.

As shown in FIG. 11, the timing management section 232 obtains the measurement start time EMS, the measurement end time EME, the measurement time period length EML and the number of times of measurement EMN (two in the example of FIG. 11) from the estimated measurement time periods EM.

The timing management section 232 estimates the measurement time periods EM in the neighboring wireless station set 120 as shown in FIG. 11, and determines the time periods during which the wireless station set 110 to which this base station belongs is to perform measurement so as not to overlap the estimated measurement time periods EM. This determination can be made in any of the manners described above with reference to FIGS. 5A, 5B, 6, 7, 9A and 9B.

In using the manners described in FIGS. 5A, 5B, 6, 7, 9A and 9B, the estimated measurement time period EM, the estimated measurement start time EMS, the measurement end time EME, the measurement time period length EML and the number of times of measurement EMN are used in place of the measurement time period MM, the measurement start time MS2, the measurement end time ME2, the measurement time period length ML2 and the number of times of measurement MN2, respectively.

As described above, in the base station of FIG. 10, even under the circumstances of failing to receive beacons issued by the base stations 121 and 131 in the neighboring wireless station sets 120 and 130, it is possible to secure measurement time periods that do not overlap measurement time periods in the neighboring wireless station sets.

Alteration to Embodiment 2

Figure 12:
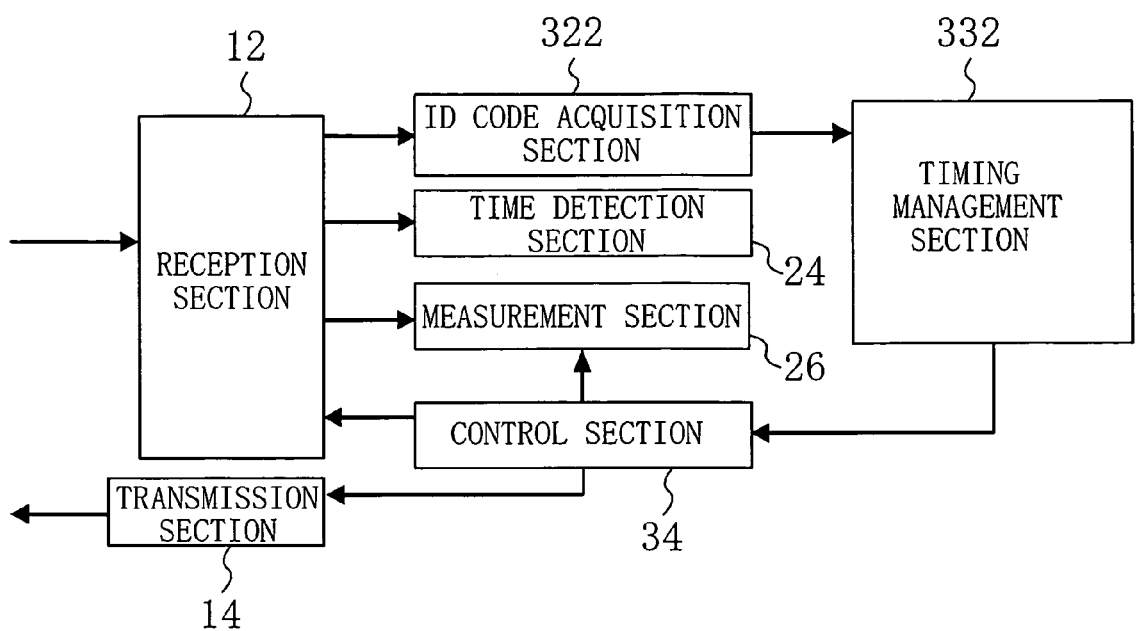
FIG. 12 is a block diagram of a base station in an alteration to Embodiment 2 of the present invention.

FIG. 12 is a block diagram of a base station in an alteration to Embodiment 2 of the present invention. The base station of FIG. 12 is different from the base station of FIG. 10 in that an ID code acquisition section 322 is newly provided and a timing management section 332 is provided in place of the timing management section 232.

The ID code acquisition section 322 receives a demodulated signal from the reception section 12, to acquire an ID code such as a receiver station ID code, a wireless station set ID code and a transmitter station ID code from the received signal, and outputs the acquired ID code to the timing management section 332. The ID code acquisition section 322 receives such an ID signal not only from a beacon but also from a data-transmitting signal.

Figure 13A:
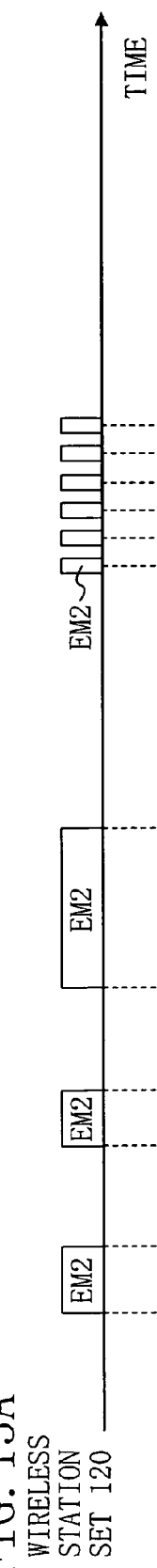
FIG. 13A is a timing chart showing the measurement time period estimated for another wireless station set.
Figure 13B:
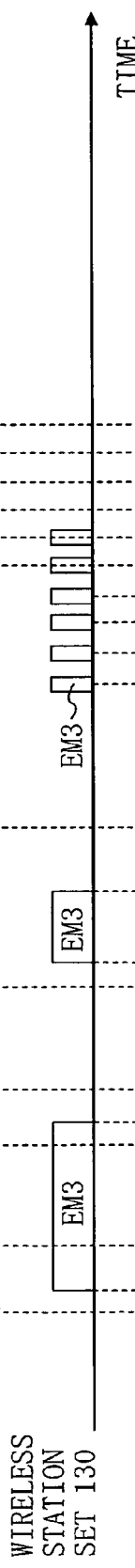
FIG. 13B is a timing chart showing the measurement time period estimated for yet another wireless station set.
Figure 13C:
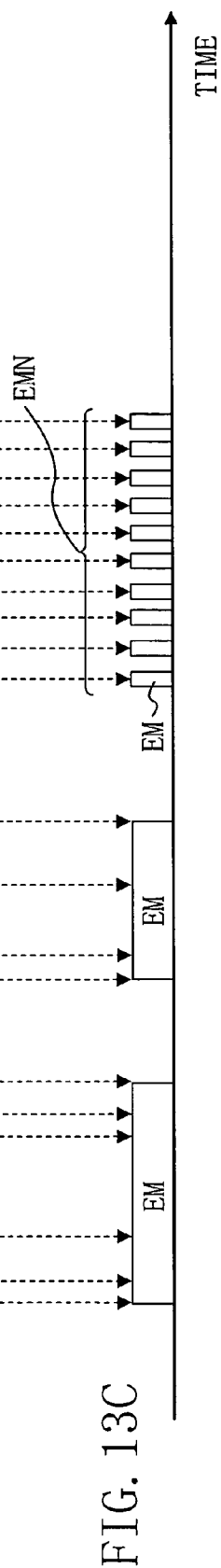
FIG. 13C is a timing chart showing the integration of the measurement time periods estimated for the two wireless station sets.

FIG. 13A is a timing chart showing estimated measurement time periods estimated for another wireless station set. FIG. 13B is a timing chart showing estimated measurement time periods estimated for yet another wireless station set. FIG. 13C is a timing chart showing integration of the measurement time periods estimated for the two wireless station sets.

Once recognizing from the ID code that the received radio wave is one transmitted from the wireless station set 120, the timing management section 332 estimates the measurement time periods EM2 in the wireless station set 120 as shown in FIG. 13A, like the timing management section 232 in FIG. 10. Likewise, once recognizing that the received radio wave is one transmitted from the wireless station set 130, the timing management section 332 estimates the measurement time periods EM3 in the wireless station set 130 as shown in FIG. 13B. Also, the timing management section 332 may manage the estimated measurement time periods EM2 and EM3 in the two wireless station sets 120 and 130 integrally as the estimated measurement time periods EM in other wireless station sets, as shown in FIG. 13C.

As described above, in the base station of FIG. 12, even when failing to acquire information on the measurement time periods from beacons issued by the base stations 121 and 131 in the neighboring wireless station sets 120 and 130, it is possible to secure measurement time periods that do not overlap measurement time periods in the neighboring wireless station sets.

Embodiment 3

Figure 14:
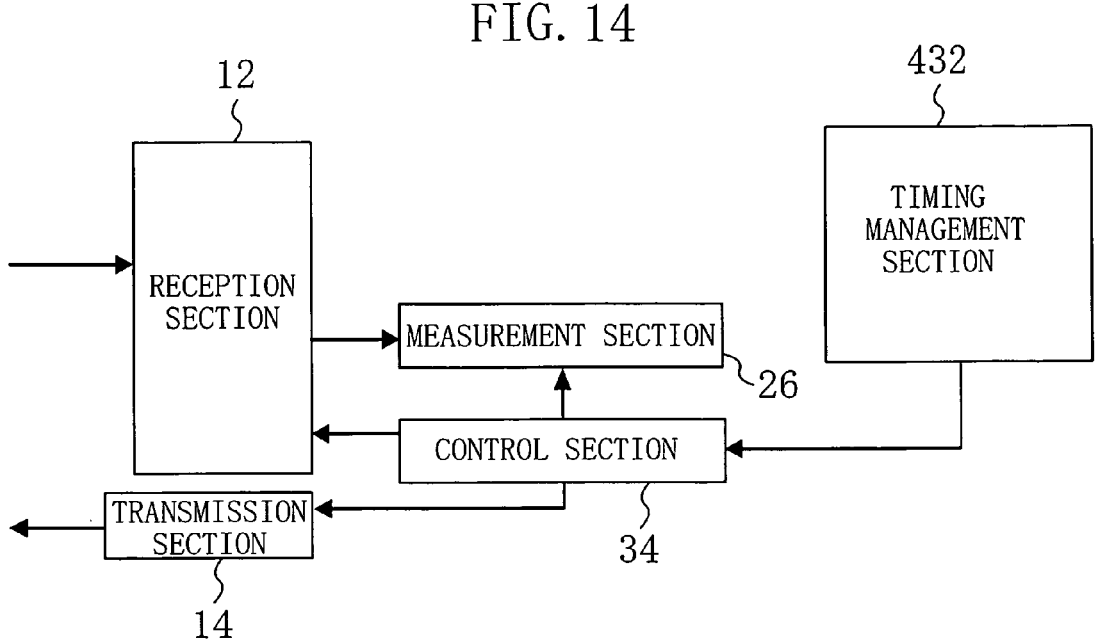
FIG. 14 is a block diagram of a base station in Embodiment 3 of the present invention.

FIG. 14 is a block diagram of a base station in Embodiment 3 of the present invention. The base station of FIG. 14 can be used in place of the base station 111 in the wireless station set 110 in FIG. 1. The base station of FIG. 14 is different from the base station 111 of FIG. 2 in that the information element acquisition section 22 and the time detection section 24 are not provided and a timing management section 432 is provided in place of the timing management section 32. The other components are the same as those described above with reference to FIG. 2, and therefore description thereof is omitted here.

The timing management section 432 in FIG. 14 successively changes the timing and the like of the measurement performed by the wireless station set 110 to which this base station belongs, to determine the time periods during which the wireless station set 110 performs measurement so as not to overlap the measurement time periods in the neighboring wireless station sets. Hereinafter, an example of this determination will be described.

Figure 15:
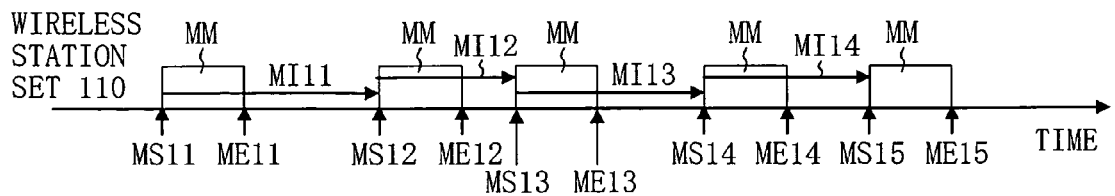
FIG. 15 is a timing chart showing an example of the case of successively changing the interval between the measurement start times.

FIG. 15 is a timing chart showing an example of the case of successively changing the interval between the measurement start times. As shown in FIG. 15, the timing management section 432 successively changes the interval between the adjacent measurement start times MS11, MS12, MS13, MS14 and MS15. Specifically, the interval MI12 between the measurement start times MS12 and MS13 is set at a length different from the interval MI11 between the measurement start times MS11 and MS12. The intervals MI13 and MI14 are also set at lengths different from each other. That is, the interval (MI11 to MI14) is made to change successively.

Alternatively, the timing management section 432 may successively change the interval between the adjacent measurement end times ME11, ME12, ME13, ME14 and ME15.

Otherwise, the timing management section 432 may successively change the interval between the measurement start times MS11 to MS14 and the measurement end times ME12 to ME15 of the respective next measurement time periods.

Likewise, the timing management section 432 may successively change the interval between the measurement end times ME11 to ME14 and the measurement start times MS12 to MS15 of the respective next measurement time periods.

Figure 16:
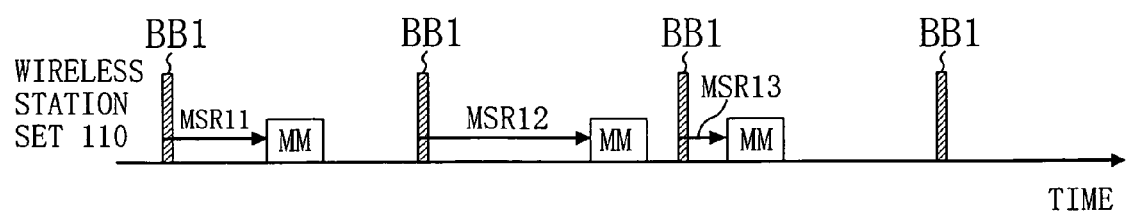
FIG. 16 is a timing chart showing an example of the case of successively changing the interval between the transmission time of a beacon and the measurement start time.
Figure 17:
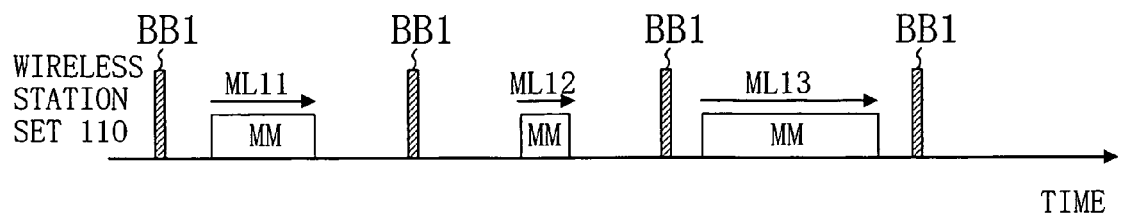
FIG. 17 is a timing chart showing an example of the case of successively changing the length of the measurement time period.

FIG. 16 is a timing chart showing an example of the case of successively changing the interval between the beacon transmission time and the measurement start time. As shown in FIG. 16, the timing management section 432 determines the intervals MSR11, MSR12, and MSR13 between the transmission times of the beacons BB1 and the measurement start times of the measurement time periods MM in the wireless station set 110 to be different lengths from one another. That is, the interval (MSR11 to MSR13) is made to change successively FIG. 17 is a timing chart showing an example of the case of successively changing the length of the measurement time period. As shown in FIG. 17, the timing management section 432 determines the lengths ML11, ML12 and ML13 of the measurement time periods MM in the wireless station set 110 to be different lengths from one another. That is, the length of the measurement time period (ML11 to ML13) is made to change successively.

Figure 18:
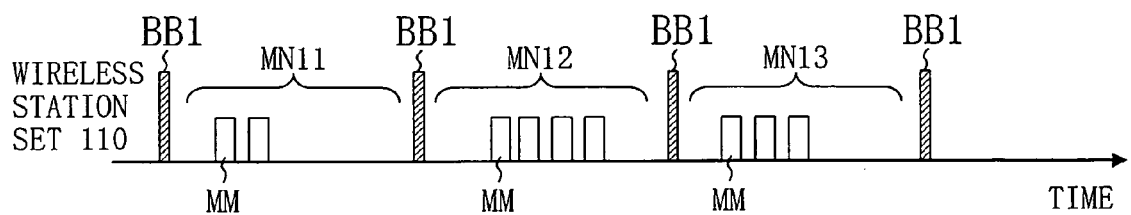
FIG. 18 is a timing chart showing an example of the case of successively changing the number of times of measurement performed within a predetermined time period.

FIG. 18 is a timing chart showing an example of the case of successively changing the number of times of measurement performed within a predetermined time period. As shown in FIG. 18, the timing management section 432 determines the numbers of times of measurement MN11, MN12 and MN13 performed within a predetermined time period in the wireless station set 110 to be different numbers from one another. That is, the number of times of measurement (MN11 to MN13) is made to change successively. The predetermined time period may be the transmission interval of beacons, for example.

The successive change of the interval and the like as shown in FIGS. 15 to 18 can be realized using uniform random numbers, functions having these numbers as arguments, functions having ID codes of the wireless station sets and the like as arguments, and the like, for example.

As described above, even under the circumstance of failing to correctly demodulate signals transmitted from the base stations 121 and 131 in the neighboring wireless station sets 120 and 130, the base station of FIG. 14 can reliably secure the measurement time periods that do not overlap the measurement time periods in the neighboring wireless station sets. Moreover, since it is unnecessary to analyze the timing of the measurement time periods in the neighboring wireless station sets, the measurement time periods can be determined independently.

The measurement time periods MM may be determined as shown in FIGS. 15 to 18 before the base station of FIG. 14 starts its operation.

The base station of FIG. 14 may notify the terminal stations 112 and 113 in the same wireless station set 110 of information on how the successive change of the interval and the like is to be made (for example, which functions and arguments are to be used) with beacons.

Embodiment 4

Figure 19:
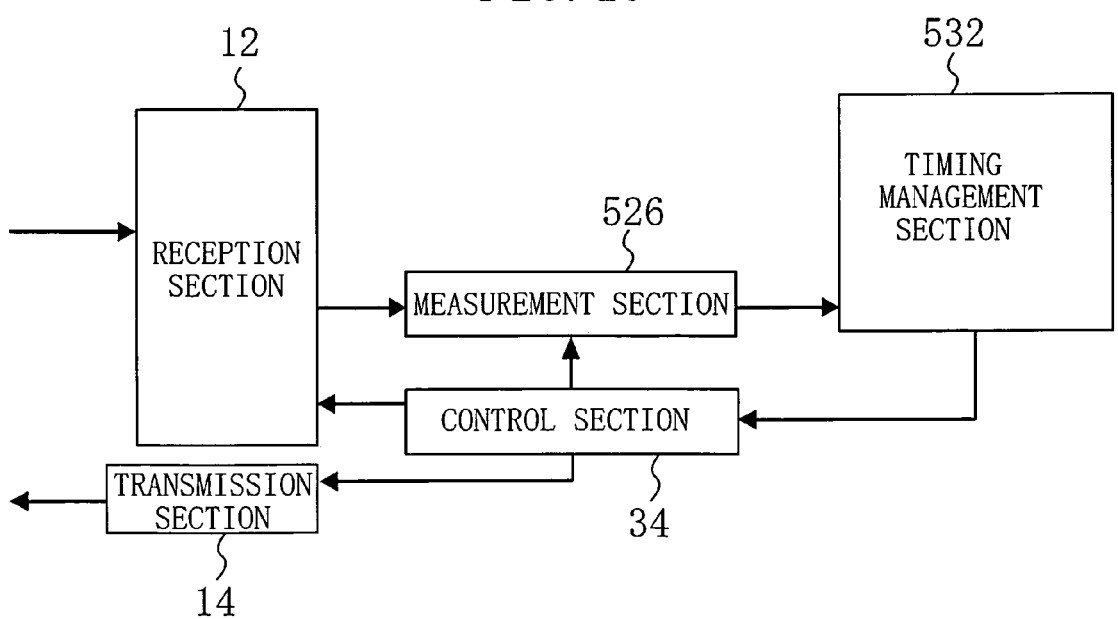
FIG. 19 is a block diagram of a base station in Embodiment 4 of the present invention.

FIG. 19 is a block diagram of a base station in Embodiment 4 of the present invention. The base station of FIG. 19 can be used in place of the base station 111 in the wireless station set 110 in FIG. 1. The base station of FIG. 19 is different from the base station of FIG. 14 in that a measurement section 526 and a timing management section 532 are provided in place of the measurement section 26 and the timing management section 432. The other components are the same as those described above with reference to FIG. 2, and therefore description thereof is omitted here.

The timing management section 532 in FIG. 19 determines the measurement time period and notifies the measurement section 526 of the determined result via the control section 34, as described above in Embodiments 1 to 3. The measurement section 526 performs measurement during the measurement time period determined by the timing management section 532, and outputs the measurement result to the timing management section 532.

The timing management section 532 changes the measurement time period based on the measurement result reported by the measurement section 526. Specifically, if the measurement result is less than a predetermined threshold, the timing management section 532 increases the measurement interval, shortens the length of the measurement time period, or decreases the number of times of measurement within a predetermined time, from the currently set value. If the measurement result exceeds a predetermined threshold, the timing management section 532 decreases the measurement interval, extends the length of the measurement time period, or increases the number of times of measurement within a predetermined time. The threshold, which is a value for judging whether the measured frequency is congested, may be a predetermined field intensity if the field intensity is measured.

Figure 20:
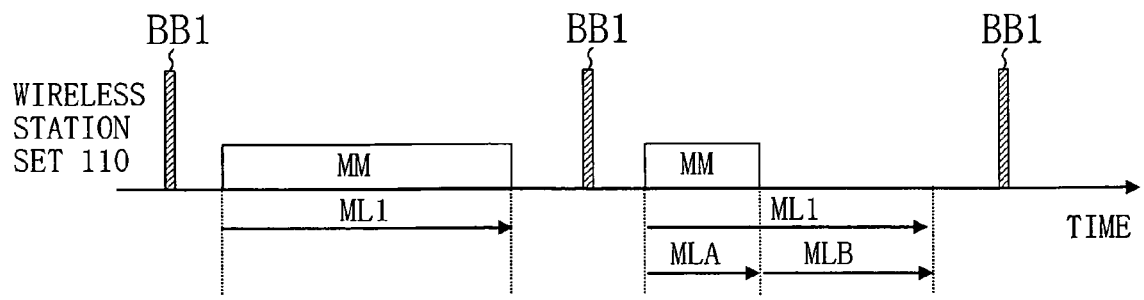
FIG. 20 is a timing chart showing an example of change of the measurement time period in the base station of FIG. 19.
Figure 21:
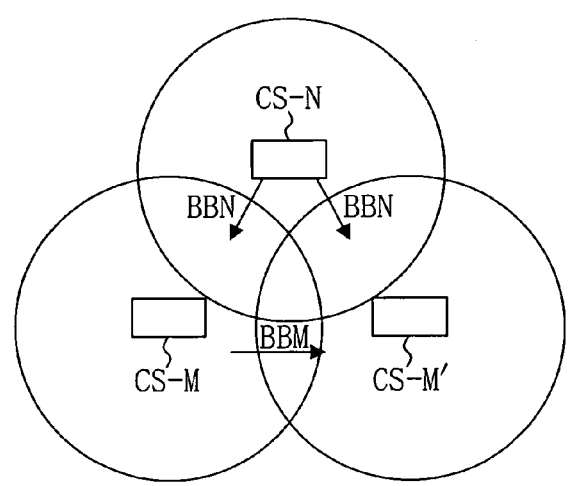
FIG. 21 is a view demonstrating a method for securing synchronization between base stations.

FIG. 20 is a timing chart showing an example of the case of changing the measurement time period in the base station of FIG. 19. Assume that the currently set measurement time period is the first measurement time period MM in FIG. 20. The measurement section 526 performs measurement during this measurement time period. If the measurement result is less than a threshold, this means that the frequency in question is not congested. In view of this, the length ML1 of this measurement time period is divided into a new measurement time period having a length MLA and a remaining time period having a length MLB. In other words, the measurement time period is shortened to increase the time period usable for data transmission.

In the system shown in FIG. 1, communication for data transmission and the measurement are performed within a limited band. Since transmission must be stopped during execution of the measurement in the same wireless station set, the communication for data transmission must be stopped. In other words, by performing the measurement, the portion of the band used for the communication for data transmission is reduced.

In the base station of FIG. 19, a portion of the limited band can be properly diverted from the measurement to the communication for data transmission without degrading the accuracy of the measurement of the propagation environment, and thus reduction in the portion of the band used for the communication for data transmission can be minimized. In addition, with decrease in useless measurement, the possibility of coincidence with a measurement time period in another wireless station set can be reduced.

A terminal station may report a measurement result to the base station, and based on the reported result, the timing management section 532 may change the measurement time period.

In Embodiments 1 to 3, also, the measurement section 26 may output the measurement result to the timing management section 32, 232, 332 or 432, and based on the received measurement result, the timing management section 32, 232, 332 or 432 may change the measurement time period in the manner described above.

The same method is not necessarily adopted in determination of the measurement time period for all frequencies, but any of the methods described above in the above embodiments may be adopted for each frequency at which measurement is performed.

As described above, the present invention permits more correct measurement of the incessantly changing propagation environment, and thus is useful for communication systems and the like allowed to select a channel among a plurality of channels different in frequency to conduct communication.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for determining a measurement time period for measuring a propagation environment in a wireless station set having a plurality of wireless stations, wireless communication being made between the plurality of wireless stations using a channel selected from a plurality of channels different in frequency, the method comprising the steps of:
   obtaining a measurement time period in another wireless station set having a plurality of wireless stations; and
   determining the measurement time period in the own wireless station set so as to have a time period that does not overlap the obtained measurement time period.

2. The method of claim 1, further comprising the steps of:
   receiving a beacon transmitted by a wireless station belonging to the another wireless station set; and
   acquiring information transmitted with the beacon,
   wherein the step of obtaining a measurement time period in another wireless station set comprises obtaining a measurement time period in the another wireless station set based on the information.

3. The method of claim 2, wherein the step of determining the measurement time period comprises determining the measurement time period so that a start time of the measurement time period in the own wireless station set does not coincide with a start time of the measurement time period in the wireless station set including the wireless station that has transmitted the beacon.

4. The method of claim 2, wherein the step of determining the measurement time period comprises determining the measurement time period so that the length of the measurement time period in the own wireless station set does not coincide with the length of the measurement time period in the wireless station set including the wireless station that has transmitted the beacon.

5. The method of claim 2, wherein the step of determining the measurement time period comprises determining the measurement time period so that the number of times of measurement performed within a predetermined time period in the own wireless station set does not coincide with the number of times of measurement performed within the predetermined time period in the wireless station set including the wireless station that has transmitted the beacon.

6. The method of claim 2, wherein the step of determining the measurement time period comprises determining the measurement time period in the own wireless station set so that if the wireless station set including the wireless station that has transmitted the beacon is in a measurement ON mode, the measurement is performed after the measurement ON mode in this wireless station set is cleared.

7. The method of claim 1, further comprising the steps of:
   receiving a radio wave transmitted by a wireless station belonging to the another wireless station set; and
   obtaining the time period during which the radio wave has not been received,
   wherein the step of obtaining a measurement time period in another wireless station set comprises estimating the time period during which the radio wave has not been received as the measurement time period in the another wireless station.

8. The method of claim 7, wherein the step of determining the measurement time period comprises determining the measurement time period so that a start time of the measurement time period in the own wireless station set does not coincide with a start time of the measurement time period in the wireless station set including the wireless station that has transmitted the radio wave.

9. The method of claim 7, wherein the step of determining the measurement time period comprises determining the measurement time period so that the length of the measurement time period in the own wireless station set does not coincide with the length of the measurement time period in the wireless station set including the wireless station that has transmitted the radio wave.

10. The method of claim 7, wherein the step of determining the measurement time period comprises determining the measurement time period so that the number of times of measurement performed within a predetermined time period in the own wireless station set does not coincide with the number of times of measurement performed within the predetermined time period in the wireless station set including the wireless station that has transmitted the radio wave.

11. The method of claim 7, further comprising the step of:
acquiring from the radio wave an ID code indicating the wireless station set that has transmitted the radio wave,
wherein the step of obtaining a measurement time period in another wireless station set comprises estimating the time period during which the radio wave has not been received from the wireless station set indicated by the ID code, as the measurement time period in this wireless station.

12. The method of claim 1, further comprising the step of:
determining the measurement time period in the own wireless station set and changing a transmission time of its own beacon based on the determined measurement time period.

13. The method of claim 1, further comprising the step of:
determining the measurement time period in the own wireless station set and changing a transmission interval of its own beacon based on the determined measurement time period.

14. The method of claim 1, wherein the step of determining the measurement time period comprises successively changing the interval between a measurement time period and the next measurement time period in the own wireless station set.

15. The method of claim 1, wherein the step of determining the measurement time period comprises successively changing the interval between a transmission time of a beacon and a start time of the measurement time period in the own wireless station set.

16. The method of claim 1, wherein the step of determining the measurement time period comprises successively changing the length of the measurement time period in the own wireless station set.

17. The method of claim 1, wherein the step of determining the measurement time period comprises successively changing the number of times of measurement within a predetermined time period.

18. The method of claim 17, wherein the predetermined time period is a time period between a beacon and the next beacon in the own wireless station set.

19. The method of claim 1, further comprising the step of:
performing measurement during the determined measurement time period,
wherein the step of determining the measurement time period comprises determining the subsequent measurement time period based on the result of the measurement.

* * * * *